(12) United States Patent
Saito et al.

(10) Patent No.: US 6,605,378 B2
(45) Date of Patent: Aug. 12, 2003

(54) FUNCTIONAL INTEGRATION OF MULTIPLE COMPONENTS FOR A FUEL CELL POWER PLANT

(75) Inventors: Kazuo Saito, Glastonbury, CT (US); Zakiul Kabir, Glastonbury, CT (US); Joshua D. Isom, Ellington, CT (US); Albert P. Grasso, Vernon, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 0 days.

(21) Appl. No.: 09/966,978

(22) Filed: Sep. 27, 2001

(65) Prior Publication Data

US 2002/0009625 A1 Jan. 24, 2002

Related U.S. Application Data

(63) Continuation-in-part of application No. 09/544,103, filed on Apr. 6, 2000, now Pat. No. 6,451,466.

(51) Int. Cl.[7] .............................................. H01M 08/04
(52) U.S. Cl. ............................ 429/26; 429/34; 429/13; 429/17
(58) Field of Search ................................ 429/20, 17, 34, 429/13, 26

(56) References Cited

U.S. PATENT DOCUMENTS

| | | | |
|---|---|---|---|
| 3,994,748 A | 11/1976 | Kunz et al. | 429/13 |
| 4,233,369 A | 11/1980 | Breault et al. | 429/26 |
| 4,344,850 A | 8/1982 | Grasso | 210/664 |
| 5,573,866 A | 11/1996 | Van Dine et al. | 429/13 |
| 5,853,909 A | 12/1998 | Reiser | 429/13 |
| 6,007,931 A | 12/1999 | Fuller et al. | 429/13 |
| 6,274,259 B1 | 8/2001 | Grasso et al. | |
| 6,416,892 B1 * | 7/2002 | Breault | 429/13 |

* cited by examiner

Primary Examiner—John S. Maples
(74) Attorney, Agent, or Firm—McCormick, Paulding & Huber LLP

(57) ABSTRACT

A fuel cell power plant having a plurality of functionally integrated components including a fuel cell assembly provided with a fuel stream, an oxidant stream and a coolant stream. The fuel cell power plant functionally integrates a mass and heat recovery device for promoting a transfer of thermal energy and moisture between a first gaseous stream and a second gaseous stream, and a burner for processing the fuel exhausted from the fuel cell assembly during operation thereof. A housing chamber is utilized in which the oxidant stream exhausted from the fuel cell assembly merges with a burner gaseous stream exhausted from the burner. The resultant airflow from the common chamber is directed back to the mass and heat recovery device as the first gaseous stream.

24 Claims, 4 Drawing Sheets

FUNCTIONAL INTEGRATION OF MULTIPLE COMPONENTS FOR A FUEL CELL POWER PLANT

CROSS REFERENCE TO RELATED APPLICATIONS

This application is a continuation-in-part of U.S. patent application Ser. No. 09/544,103, entitled "Functional Integration Of Multiple Components For A Fuel Cell Power Plant", filed on Apr. 6, 2000, now U.S. Pat. No. 6,451,466, and herein incorporated by reference in its entirety.

FIELD OF THE INVENTION

This invention relates in general to a functional integration of multiple components for a fuel cell power plant, and deals more particularly with the functional integration of multiple components of a fuel cell power plant whereby the strong characteristics of each component may be utilized to compensate for the weak characteristics of the other components.

BACKGROUND OF THE INVENTION

Electrochemical fuel cell assemblies are known for their ability to produce electricity and a subsequent reaction product through the interaction of a fuel being provided to an anode electrode and an oxidant being provided to a cathode electrode, generating an external current flow therebetween. Such fuel cell assemblies are very useful due to their high efficiency, as compared to internal combustion fuel systems and the like, and may be applied in many fields. Fuel cell assemblies are additionally advantageous due to the environmentally friendly chemical reaction by-products, typically water, which are produced during their operation. Owing to these characteristics, amongst others, fuel cell assemblies are particularly applicable in those fields requiring highly reliable, stand-alone power generation, such as is required in space vehicles and mobile units including generators and motorized vehicles.

Electrochemical fuel cell assemblies typically employ a hydrogen rich gas stream as a fuel and an oxygen rich gas stream as an oxidant where the reaction by-product is water. Such fuel cell assemblies may employ a membrane consisting of a solid polymer electrolyte, or ion exchange membrane, disposed between the anode and cathode electrode substrates formed of porous, electrically conductive sheet material—typically, carbon fiber paper. One particular type of ion exchange membrane is known as a proton exchange membrane (hereinafter PEM), such as sold by DuPont under the trade name NAFION™ and well known in the art. Catalyst layers are formed between the PEM and each electrode substrate to promote the desired electrochemical reaction. The catalyst layer in a fuel cell assembly is typically a carbon supported platinum or platinum alloy, although other noble metals or noble metal alloys may be utilized. In order to control the temperature within the fuel cell assembly, a water coolant is typically provided to circulate about the fuel cell assembly.

Other commonly known electrolytes used in fuel cell assemblies include phosphoric acid or potassium hydroxide held within a porous, non-conductive matrix. It has, however, been found that PEM fuel cell assemblies have substantial advantages over fuel cells with liquid or alkaline electrolytes due to the superior performance of the PEM in providing a barrier between the circulating fuel and oxidant, while also being more tolerant to pressure differentials than a liquid electrolyte that is held by capillary forces within a porous matrix. Moreover, a PEM electrolyte is fixed and will not leach from the fuel cell assembly and retains a relatively stable capacity for water retention.

In the typical operation of a PEM fuel cell assembly, a hydrogen rich fuel permeates the porous electrode material of the anode and reacts with the catalyst layer to form hydrogen ions and electrons. The hydrogen ions migrate through the PEM to the cathode electrode while the electrons flow through an external circuit to the cathode electrode. At the cathode electrode, the oxygen-containing gas supply also permeates through the porous substrate material and reacts with the hydrogen ions and the electrons from the anode electrode at the catalyst layer to form the by-product water. Not only does the PEM facilitate the migration of these hydrogen ions from the anode to the cathode, but the ion exchange membrane also acts to isolate the hydrogen rich fuel from the oxygen-containing gas oxidant. The reactions taking place at the anode and cathode catalyst layers are represented by the equations:

$$H_2 \rightarrow 2H^+ + 2e \quad \text{Anode reaction}$$

$$\tfrac{1}{2}O_2 + 2H^+ + 2e \rightarrow H_2O \quad \text{Cathode reaction}$$

Conventional PEM fuels cells have the ion exchange membrane positioned between two permeable, electrically conductive plates, referred to as the anode and cathode plates. The plates are typically formed from graphite, a graphite-polymer composite, or the like. The plates act as a structural support for the two porous, electrically conductive electrode substrates, as well as serving as current collectors and providing the means for carrying the fuel and oxidant to the anode electrode and cathode electrode, respectively. They are also utilized for carrying away the reactant by-product water during operation of the fuel cell.

Moreover, the plates may have formed therein reactant feed manifolds which are utilized for supplying the fuel to the anode flow channels or, alternatively, the oxidant to the cathode flow channels. They may also have corresponding exhaust manifolds to direct unreacted components of the fuel and oxidant streams, and any water generated as a by-product, from the fuel cell. The construction and operation of a typical PEM fuel cell are well known and are described in detail in commonly owned U.S. Pat. No. 5,853,909, issued to Reiser, and incorporated herein by reference in its entirety. Alternatively, the manifolds may be external to the fuel cell itself, as shown in commonly owned U.S. Pat. No. 3,994,748, issued to Kunz et al., and incorporated herein by reference in its entirety.

Recent efforts at producing the fuel for fuel cell assemblies have focused on utilizing a hydrogen rich gas produced from the chemical conversion of hydrocarbon fuels, such as methane, natural gas, gasoline or the like, into a hydrogen rich stream. This process requires that the hydrogen produced must be efficiently converted to be as pure as possible, thereby ensuring that a minimal amount of carbon monoxide and other undesirable chemical byproducts are produced. This conversion of hydrocarbons is generally accomplished through the use of a steam reformer or an autothermal reformer. Reformed hydrocarbon fuels frequently contain quantities of ammonia, $NH_3$, as well as significant quantities of carbon dioxide, $CO_2$. These gases tend to dissolve and dissociate into the water which is provided to, and created within, the fuel cell assembly. The resultant contaminated water supply may cause the conductivity of the water to increase to a point where shunt current corrosion occurs in the coolant channels and manifold leading to degradation of fuel cell materials, as well as reducing the electrical conductivity of the PEM and thereby reducing the efficiency of the fuel cell assembly as a whole.

As disclosed above, the anode and cathode plates may be part of a coolant loop which provides coolant channels for the circulation of a water coolant, as well as for the wicking and carrying away of excessive water produced as a by-product of the fuel cell assembly operation. The water which is collected and circulated through a fuel cell assembly is therefore susceptible to contamination and may damage and impair the operation of the fuel cell assembly.

It is therefore necessary to provide a system which protects the fuel cell assembly from water contamination. One such system is described in commonly owned U.S. Pat. No. 4,344,850, issued to Grasso, and incorporated herein by reference in its entirety. Grasso's system for treating the coolant supply of a fuel cell assembly, as illustrated in FIG. 1 of U.S. Pat. No. 4,344,850, utilizes a separate filter and demineralizer for purifying a portion of the coolant supplied to the fuel cell assembly. A separate degasifier is also utilized to process the condensed water obtained from a humidified cathode exit stream. As discussed in Grasso, the heat exchange occurring between the coolant stream and the body of the fuel cell assembly is accomplished according to commonly assigned U.S. Pat. No. 4,233,369, issued to Breault et al., incorporated herein by reference in its entirety.

It is important to note that Grasso's coolant system does not provide for the cleansing of the coolant stream as a whole. This is due to the fact that the coolant conduits in Grasso, being fashioned from copper or the like, are not in diffusable communication with the body of the fuel cell assembly and as such, the coolant stream does not receive contamination from, inter alia, the $CO_2$ or $NH_3$ present in the reformed fuel stream. The burden of cleansing the coolant stream in Grasso is therefore born solely by the filter and demineralizer and results in greater wear on these components and hence greater repairs and replacements. Grasso also utilizes two distinct coolant pumps for circulating the coolant.

Another coolant treatment system has been disclosed in commonly assigned co-pending U.S. patent application Ser. No. 09/295,732, entitled "Water Treatment System for a Fuel Cell Assembly", herein incorporated by reference in its entirety. U.S. patent application Ser. No. 09/295,732 utilizes an unique arrangement of separate demineralizers and degasifiers to cleanse the entire circulating coolant stream while providing for the humidification of an inputted oxidant stream.

Complicating the objective of providing a coolant treatment system is the cumulative effect that the multitude of components in a fuel cell power plant have on the overall weight, volume, and complexity of the system.

In practical applications, a plurality of planar fuel cell assemblies are typically arranged in series, commonly referred to as a cell stack assembly. The cell stack assembly may be surrounded by an electrically insulating housing that defines the various manifolds necessary for directing the flow of a hydrogen rich fuel and an oxygen rich oxidant to the individual fuel cell assemblies, as well as a coolant stream, in a manner well known in the art. The cell stack assembly, including any associated components such as a degasifier, a demineralizer, a steam reformer, a heat exchanger and the like may, as a whole, be referred to as a fuel cell power plant.

As will be appreciated by one so skilled in the art, integrating these differing components into a cohesive fuel cell power plant operating within specific design parameters results in a complex and oftentimes cumbersome structure.

Specifically, in the operation of PEM fuel cells, it is critical that a proper water balance be maintained between a rate at which water is produced at the cathode electrode, including water resulting from proton drag through the PEM electrolyte, and rates at which water is removed from the cathode or supplied to the anode electrode. An operational limit on performance of a fuel cell is defined by an ability of the cell to maintain an optimal water balance as the electrical current drawn from the cell into the external load circuit varies and as an operating environment of the cell varies. For PEM fuel cells, if insufficient water is returned to the anode electrode, adjacent portions of the PEM electrolyte dry out, thereby decreasing the rate at which hydrogen ions may be transferred through the PEM and also resulting in cross-over of the reducing fluid leading to local over heating. Similarly, if insufficient water is removed from the cathode, the cathode electrode may become flooded effectively limiting oxidant supply to the cathode and hence decreasing current flow. Additionally, if too much water is removed from the cathode, the PEM may dry out limiting ability of hydrogen ions to pass through the PEM thus decreasing cell performance.

Given that fuel cells have been integrated into power plants developed to power transportation vehicles such as automobiles, trucks, buses, etc., maintaining a water balance within the power plant has become a greater challenge because of a variety of factors. For example, with a stationary fuel cell power plant, water lost from the plant may be replaced by water supplied to the plant from off-plant sources. With a transportation vehicle, however, to minimize fuel cell power plant weight and space requirements, the plant must be self-sufficient in water to be viable. Self-sufficiency in water means that enough water must be retained within the plant to offset water losses from gaseous streams of reactant fluids passing through the plant. For example, any water exiting the plant through a cathode exhaust stream of gaseous oxidant or through an anode exhaust stream of gaseous reducing fluid must be balanced by water produced electrochemically at the cathode and retained within the plant.

An additional requirement for maintaining water self-sufficiency in fuel cell power plants is associated with components necessary to process hydrocarbon fuels, such as methane, natural gas, gasoline, methanol, diesel fuel, etc., into an appropriate reducing fluid that provides a hydrogen rich fluid to the anode electrode. Such fuel processing components of a fuel cell power plant typically include a boiler that generates steam; a steam duct into which the hydrocarbon fuel is injected; and an autothermal reformer that receives the steam and fuel mixture along with a small amount of a process oxidant such as air and transforms the mixture into a hydrogen-rich reducing fluid appropriate for delivery to the anode electrode of the fuel cell. The fuel processing components or system water and energy requirements are part of an overall water balance and energy requirement of the fuel cell power plant. Water made into steam in the boiler must be replaced by water recovered from the plant such as by condensing heat exchangers in the cathode exhaust stream and associated piping.

A common approach to enhancing water recovery and retention is use of condensing heat exchangers in exhaust streams of the power plant wherein the exhaust streams are cooled to a temperature at or below their dew points to condense liquid water from the exhaust streams so that the liquid may be returned to the power plant. An example of a PEM fuel cell power plant using a condensing heat exchanger is shown in U.S. Pat. No. 5,573,866 that issued on Nov. 12, 1996, to Van Dine et al., and is assigned to the assignee of the present invention, and which patent is hereby incorporated herein by reference in its entirety. Many other fuel cell power plants that use one or more condensing heat exchangers are well-known in the art, and they typically use ambient air streams as a cooling fluid passing through the heat exchanger to cool the plant exhaust streams. In Van Dine et al., the heat exchanger is used to cool a cathode exhaust stream, which upon leaving a cathode chamber includes evaporated product water and some portion of methanol, the reducing fluid, that has passed through the PEM. The condensing heat exchanger passes the cathode exhaust stream in heat exchange relationship with a stream of cooling ambient air, and then directs condensed methanol and water indirectly through a piping system back to an anode side of the cell.

While condensing heat exchangers have enhanced the water recovery and energy efficiency of fuel cell power plants, the heat exchangers encounter decreasing water recovery efficiency as ambient temperatures increase. Where the power plant is to power a transportation vehicle such as an automobile, the plant will be exposed to an extremely wide range of ambient temperatures. For example, where an ambient air coolant stream passes through a heat exchanger, performance of the exchanger will vary as a direct function of the temperature of the ambient air because decreasing amounts of liquid condense out of power plant exhaust streams as the ambient air temperature increases.

An additional requirement of using such condensing heat exchangers in fuel cell power plants powering transportation vehicles is related to operation of the vehicles in temperatures below the freezing temperature of water. Because water from such exchangers is often reintroduced into the PEM fuel cells of the plant, the water may not be mixed with conventional antifreeze to lower its freezing temperature. Propylene glycol and similar antifreezes would be adsorbed by the catalysts in the cells decreasing cell efficiency, as is well known.

Accordingly, known fuel cell power plants that employ ambient air as the cathode oxidant and/or that use condensing heat exchangers are incapable of efficiently maintaining a self-sufficient water balance when operating at high ambient temperatures because of their above described characteristics. It is therefore highly desirable to produce a fuel cell power plant that can achieve a self-sufficient water balance without a condensing heat exchanger while minimizing plant operating energy requirements.

Commonly assigned U.S. patent application Ser. No. 09/395,704, entitled "Fine Pore Enthalpy Exchange Barrier For A Fuel Cell Power Plant", filed Sep. 14, 1999, herein incorporated by reference in its entirety, discloses one such method of integrating a fuel cell power plant heat exchange mechanism with a water balancing process by utilizing an enthalpy exchange barrier. By ensuring that an inlet and outlet oxidant stream are placed in fluid communication with one another on opposing sides of an enthalpy exchange barrier, the fuel cell power plant ensures that the inlet oxidant stream is sufficiently humidified while simultaneously decreasing the thermal and water content of the outlet oxidant stream. Commonly owned U.S. Pat. No. 6,007,931, entitled a "Mass and Heat Recovery System for a Fuel Cell Power Plant", discloses yet another method of integrating a fuel cell power plant heat exchange mechanism with a water balancing process and is herein incorporated by reference in its entirety.

With the forgoing problems and concerns in mind, the present invention seeks to provide a fuel cell power plant in which a multitude of separate components are integrated in order to allow the fuel cell power plant to operate at peak efficiency and to minimize the weight, volume and complexity of the power plant.

SUMMARY OF THE INVENTION

It is an object of the present invention to provide a functional integration of multiple components of a fuel cell power plant.

It is another object of the present invention to integrate the functions of multiple components of a fuel cell power plant so that the strengths of one component act to mitigate the weaknesses of another.

It is another object of the present invention to provide a functional integration of multiple components of a fuel cell power plant, which also humidifies the oxidant stream provided to the cathode of a fuel cell assembly.

It is another object of the present invention to reduce the possibility of contaminating gas build-up within the fuel cell power plant.

It is another object of the present invention to provide functional integration of multiple components to reduce the weight and volume of a fuel cell power plant.

According to one embodiment of the present invention, a fuel cell power plant having a plurality of functionally integrated components includes a fuel cell assembly provided with a fuel stream, an oxidant stream and a coolant stream. The fuel cell power plant functionally integrates a mass and heat recovery device for promoting a transfer of thermal energy and moisture between a first gaseous stream and a second gaseous stream, and a burner for processing the fuel exhausted from the fuel cell assembly during operation thereof. A housing chamber is utilized in which the oxidant stream exhausted from the fuel cell assembly merges with a burner gaseous stream exhausted from the burner. The resultant gaseous flow from the common chamber is directed back to the mass and heat recovery device as the first gaseous stream.

These and other objectives of the present invention, and their preferred embodiments, shall become clear by consideration of the specification, claims and drawings taken as a whole.

DETAILED DESCRIPTION OF THE PREFERRED EMBODIMENT

Figure 1:
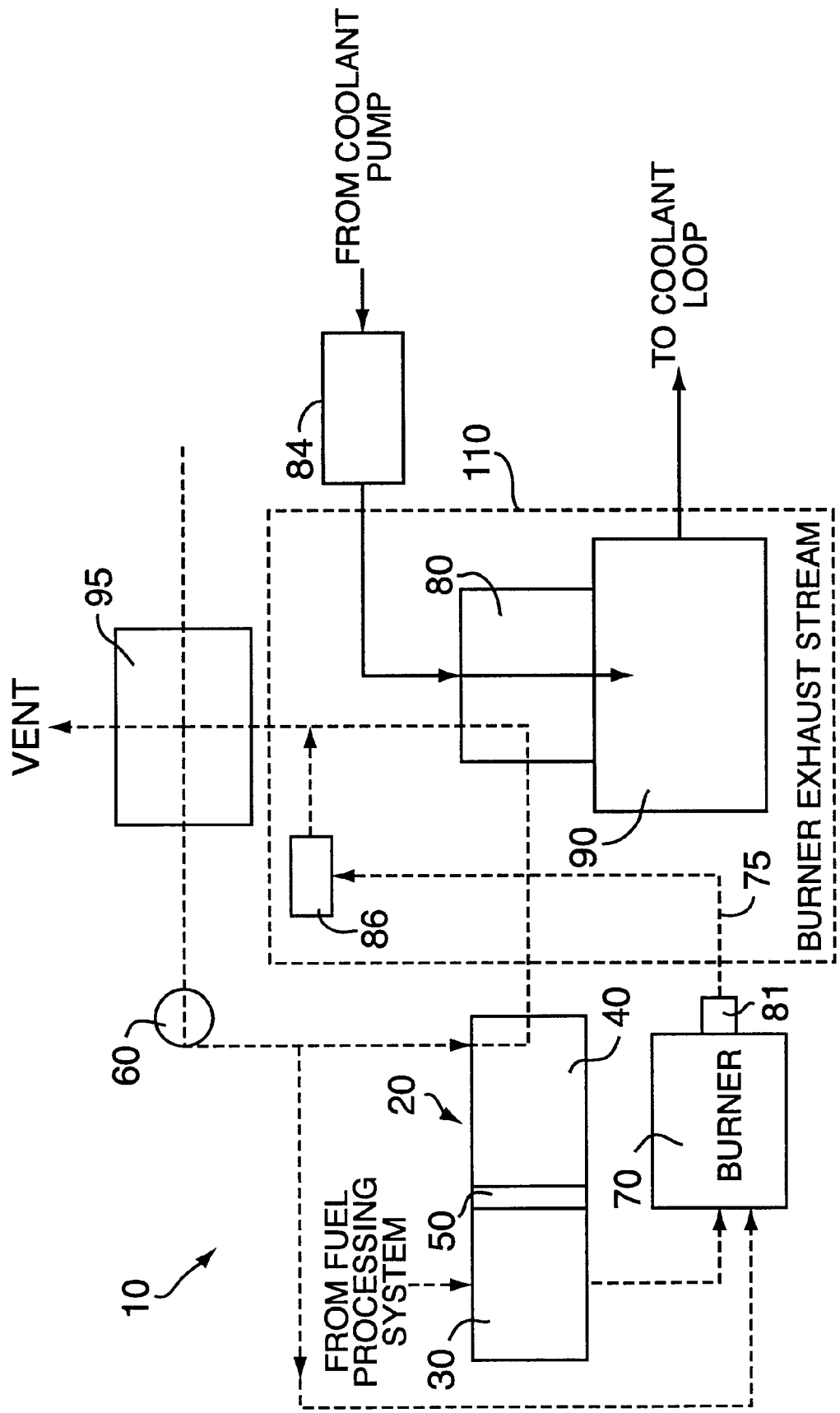
FIG. 1 illustrates a schematic illustration of a fuel cell power plant according to one embodiment of the present invention.

An integrated fuel cell power plant according to the present invention is schematically illustrated in FIG. 1 and is generally designated by reference numeral 10. The fuel cell power plant 10 includes at least one fuel cell assembly 20 having an anode electrode 30, a cathode electrode 40 and an electrolyte 50 disposed there-between. By supplying a hydrogen rich fuel to the anode electrode 30 and an oxygen rich oxidant to the cathode electrode 40, the fuel cell assembly 20 will produce electrical energy in a manner well known in the art. In the preferred embodiment of the present invention, the fuel cell assembly 20 of FIG. 1 employs a proton exchange membrane ("PEM") as the electrolyte 50 which is coated on either side thereof with an unillustrated catalyst layer utilized to promote the electrochemical reaction within the fuel cell assembly 20.

The anode electrode 30 and the cathode electrode 40 may contain porous carbon-carbon fibrous composite substrates having a porosity of about 65% to about 75%, and may be wet-proofed by a hydrophobic substance such as Teflon®, as is known. The fuel cell assembly 20 may also contain unillustrated plates which provide the means for carrying the reactants to the electrodes.

While FIG. 1 depicts a single fuel cell assembly 20, the fuel cell power plant 10 may be alternatively operated in conjunction with a plurality of electrically coupled planar fuel cell assemblies forming thereby a cell stack assembly that is encased within a non-illustrated housing and which defines various reactant manifolds for directing a hydrogen rich fuel stream and an oxygen rich oxidant stream to and from the cell stack assembly as a whole. A coolant manifold system may also be provided to direct a coolant stream to and from the fuel cell assembly 20 or the cell stack assembly in a manner also well known in the art.

In operation, it is desired that pure hydrogen be utilized as the fuel supply for the fuel cell assembly 20 shown in FIG. 1; however, such pure hydrogen is often expensive to obtain and store. Other hydrocarbons such as, but not limited to, methane, butane, propane, ethanol, natural gas and gasoline are therefore utilized as a fuel, but only after these hydrocarbons have been processed by a known fuel processing system that converts these hydrocarbons to a hydrogen rich fuel, which is then supplied to the anode electrode 30, as depicted in FIG. 1.

The fuel cell power plant 10 also includes an oxidant pump 60 for directing an inlet, oxygen-rich oxidant stream to the cathode electrode 40; a burner 70 for providing the heat required by the fuel processing system, wherein the burner 70 utilizes diluted fuel exhausted from the anode electrode 30 and, in certain embodiments, oxidant from the oxidant pump 60 to produce the steam needed by the fuel processing system; a degasifier 80 which acts in concert with the oxidant exhausted from the cathode electrode 40 to strip contaminants from the coolant exhausted from the fuel cell assembly 20, wherein the coolant is typically water circulated in a coolant loop in thermal contact with the fuel cell assembly 20; an accumulator 90 for providing a reservoir within which excess water may be stored for subsequent use, upon demand, by the fuel cell assembly 20; and an enthalpy recovery device ("ERD") 95 which provides the dual functions of thermal energy and water transfer between the inlet and the exhausted oxidant stream and a burner exhaust stream 75, thereby assisting in the humidification of the PEM of the fuel cell assembly 20. FIG. 1 also illustrates a pair of heat exchange devices, 81 and 84, which may be optionally provided to the fuel cell power plant 10 to assist in lowering the temperature of the gases discharged from the burner 70, and the inlet coolant stream, respectively. FIG. 1 further includes a spray nozzle assembly 86 which may be optionally included as a constituent element of the fuel cell power plant 10, as will be described in more detail later in conjunction with FIG. 4.

Although the degasifier 80 and the accumulator 90 are shown as distinct structural bodies in FIG. 1, in practical application they preferably occupy a common housing 110, as depicted in FIG. 1, which is in structural integration with the ERD 95, as will be described in more detail later in conjunction with FIGS. 2 and 3.

As was discussed in some detail previously, the efficient operation of a PEM fuel cell assembly depends in large part on the water management of the fuel cell assembly, including maintaining a humidified PEM and disposing of excess water created within the fuel cell assembly during operation. In specific relation to the fuel cell power plant 10 of FIG. 1, as the fuel cell assembly 20 is operated, the oxidant exhausted from the cathode 40 will contain a measured amount of water, thermal energy and oxygen-containing gas. It is therefore a general object of the present invention to utilize the oxidant stream exhausted from the fuel cell assembly 20 and the burner exhaust stream from the burner to perform a multitude of beneficial operations. Moreover, the architecture of the fuel cell power plant 10 is arranged so as to integrate the strengths and weaknesses of each component of the fuel cell power plant 10, thereby achieving a more efficient and compact fuel cell power plant.

Figure 2:
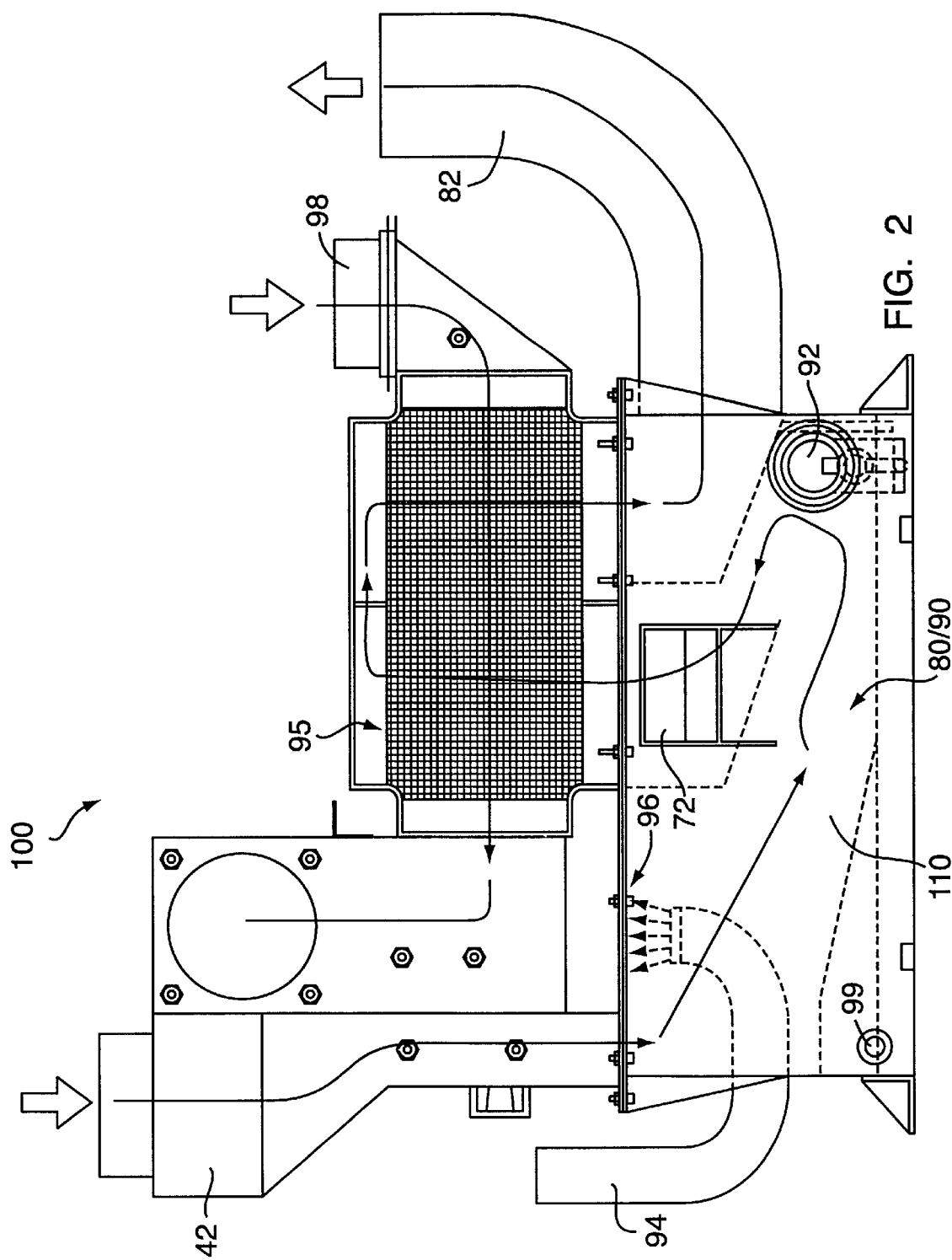
FIG. 2 is a cross-sectional view of a housing integrating multiple components of a fuel cell power plant according to one embodiment of the present invention.

FIG. 2 illustrates a cross-sectional view of a housing 100 which integrates the ERD 95, the accumulator 90 and the degasifier 80, wherein the fuel cell assembly 20 of FIG. 1 is removed for clarity. As will be further described hereinafter, each component of the fuel cell power plant 10 is integrated into the housing 100 in a manner advantageous to the fuel cell power plant 10 as a whole. As noted previously, the fuel cell assembly 20 may be alternative replaced with a cell stack assembly for use in connection with the fuel cell power plant of the present invention.

A major component of the integrated fuel cell power plant 10 of FIG. 1 is the ERD 95. The ERD 95 includes a support matrix that defines pores and a liquid transfer medium that fills the pores creating a gas barrier. The matrix is hydrophilic, and therefore capable of being wetted by the liquid transfer medium, while the pores themselves may be sized in the ranges of approximately 0.1 to 100 microns. While the matrix may be formed as a plurality of rigid, porous, graphite layers; rigid, porous, graphite-polymer layers; rigid, inorganic-fiber thermoset polymer layers; glass fiber layers; synthetic-fiber layers treated so as to be wettable; and perforated, metal layers having particulate matter suspended within the perforations, the present invention is not limited in this regard as other, alternative constructions are envisioned provided that the ERD 95 as a whole operates as an efficient exchanger of heat and mass capable of assuredly preventing the mixture of differing and adjacent gaseous streams.

The liquid transfer medium may be comprised of water, aqueous salt solutions, aqueous acid solutions and organic anti-freeze solutions, wherein the transfer medium is capable of absorbing fluid substances including, in particular, polar molecules such as water from a passing fluid stream composed of polar and non-polar molecules. The matrix itself should preferably be crafted as having a high thermal conductivity, thus assisting in the transfer of heat between adjacent gaseous streams.

As alluded to above, the ERD 95 acts as a heat and mass exchanger having porous wettable plates which eliminate gaseous stream crossover. In operation, the ERD 95 helps prevent water loss from the fuel cell power plant 10 by passing the inlet oxidant stream adjacent to the humid, exhausted gases from the fuel cell power plant 10, as will be described in more detail below.

As is best depicted in FIG. 2, a stream of inlet oxidant is either drawn or propelled by the unillustrated oxidant blower 60 through an inlet ERD manifold 98. In transportation applications, this inlet oxidant stream may be obtained from the ambient air surrounding the vehicle, thereby having differing degrees of humidity and frequently being somewhat arid. The inlet oxidant stream passes through the ERD 95 in a counter-current manner to the now-humidified, exhausted gases exiting from the fuel cell assembly 20 via an oxidant exit duct 42. The close association between these two gaseous streams within the ERD 95 allows water vapor and entrained water molecules in the exhausted gases to migrate to and humidify the inlet oxidant stream. Thermal exchange will also take place within the ERD 95 between the inlet oxidant stream and the exhausted gases, thereby lowering the temperature of the exhausted gases. As will be appreciated by one of ordinary skill in the art, the more arid the inlet oxidant stream is, the greater the rate of humidification and heat transfer will be with the exhausted gases.

Among the important aspects of the present invention, therefore, is the ability of the integrated ERD 95 to provide the fuel cell assembly 20 with a humidified inlet oxidant stream, as well as lowering the temperature of the gases exhausted from the fuel cell power plant 10. Moreover, the integrated ERD 95 inherently and automatically compensates for inlet oxidant streams having differing levels of humidity by promoting a greater or lesser rate of water and thermal transfer in dependence upon the humidity of the inlet oxidant stream.

Returning to FIGS. 1 and 2, it will be apparent that the exhausted gas stream entering the housing 100 via the oxidant exit duct 42 is not directly provided to the ERD 95, rather it is first channeled through a chamber 110. The chamber 110 houses the accumulator 90, the degasifier 80, and provides an inlet opening 72 for accepting inlet gases from the burner 70. The gases discharged from the burner 70 are typically high in temperature and require cooling prior to exhausting these gases to the outside, as well as containing a significant amount of water vapor which may be advantageously utilized, as will hereinafter be described. It will be readily appreciated that the portion of the chamber 110 acting as the degasifier 80 may be formed as any known mass transfer device capable of effecting mass transfer between a liquid stream and a gas stream. Examples of such mass transfer devices are packed beds, wetted films, spray towers, or the like.

The chamber 110 is also provided with a coolant inlet 94 for accepting used coolant from the fuel cell assembly 20, and a coolant egress 92 for re-supplying the coolant back to the fuel cell assembly 20. The present invention advantageously mixes the burner exhaust, the exhausted coolant stream and the oxidant exhaust from the fuel cell assembly 20 within the chamber 110, so as to increase the overall performance of the fuel cell power plant 10. A level sensor 99, or the like, is also provided to the chamber 110.

In operation, as the heated and humidified gases exhausted from the fuel cell assembly 20 enter the chamber 110, they come into cross-current contact with the exhausted and contaminated coolant from the fuel cell assembly 20. As noted above, the exhausted coolant becomes contaminated in response to the typical utilization of reformed hydrocarbon fuels as one of the input reactants to the fuel cell power plant 10. These reformed hydrocarbon fuels typically contain quantities of ammonia, $NH_3$, and hydrogen, $H_2$, as well as significant quantities of carbon dioxide, $CO_2$. The $NH_3$ and $CO_2$ gases tend to dissolve and dissociate into the water coolant which may be provided to, and created within, the fuel cell assembly 20. The gases react with the water and form ionic reaction by-products. In addition, water within the fuel cell assembly 20 containing concentrations of ammonia even as small as 2 parts per million (ppm) can act to displace protons in the PEM 50, thereby reducing the conductivity of the PEM 50 and thus, the efficiency of the fuel cell power plant 10 as a whole. High solubility dissolved gases, such as $NH_3$ and $CO_2$, within the water may also result in large gas bubbles in the coolant stream of the fuel cell assembly 20 which may cause drying of the anode and cathode porous plates, thereby resulting in mixing of the reactants. For these reasons, the degasifier 80 is utilized to strip contaminants which may have dissolved or dissociated into the coolant stream of the fuel cell power plant 10 during operation.

Returning to FIG. 2, as the heated and humidified gases exhausted from the fuel cell assembly 20 enter the chamber 110 and come into cross-current contact with the contaminated coolant from the fuel cell assembly 20 in the presence of the degasifier 80, significant quantities of the $NH_3$, $H_2$ and $CO_2$ gases are striped from the coolant stream. The configuration of the housing 100 assists this operation as the vigorous action of the exhausted coolant stream striking an upper portion 96 of the chamber 110 provides the mass transfer device of the degasifier 80 with a shower of coolant having a large surface area, thereby promoting a more efficient reduction of contaminants from the exhausted coolant stream. As the airflow within the chamber 110 continues to flow, it comes into contact with the exhaust gases from the burner 70 via the inlet opening 72 and forms thereby a process exhaust stream. In this manner, the process exhaust stream absorbs both thermal energy and humidity from the inlet burner gases. At this point, the process exhaust stream is provided to the ERD 95 where, as discussed previously, a portion of the thermal energy and humidity of the process exhaust stream is transferred to the inlet oxidant stream. After circulating through the ERD 95, the now-cooled process exhaust stream is subsequently vented to the outside via a process exhaust pipe 82.

One important aspect of the present invention, therefore, is that contaminants are effectively striped from the coolant supply and exhausted from the fuel cell power plant 10 via the process exhaust pipe 82. It should be noted that the contaminants travelling with the process exhaust stream do not migrate to the inlet oxidant stream due to the wetted matrix of the ERD 95 which prohibits this action. Moreover, the excess humidity added by the burner exhaust to the process exhaust stream as it passes through the chamber 110 assists this operation by ensuring that the matrix of the ERD 95 stays sufficiently humidified, while also providing an additional measure of water to help humidify the inlet oxidant stream.

Another important aspect of the present invention lies in locating the accumulator 90 and the degasifier 80 within the common chamber 110, in contact with both the burner exhaust stream and the coolant supply. With such a configuration, it becomes possible to compactly remove contaminants from the exhausted coolant while providing the integrated accumulator 90 with a ready supply of cleansed coolant for subsequent resupply to the fuel cell assembly 20 as needed. Furthermore, the moisture added to the process exhaust stream via the burner inlet opening 72 promotes the condensation of water within the chamber 110, thereby conserving even more of the water important for operation of the fuel cell power plant 10. An unillustrated overflow pipe is provided to the chamber 110 to dispose of excess water within the accumulator 90.

Previously known fuel cell systems either vented the burner exhaust to the outside without utilizing the moisture therein, or enlisted separate heat exchangers and moisture recovery devices for this purpose. Therefore, yet another important aspect of the present invention is the efficient use of fuel cell power plant thermal energy and moisture, while reducing the number of components necessary to accomplish such a goal. Specifically, the present invention reduces the need for a separate burner exhaust heat exchanger by cooling the burner exhaust gaseous stream with other existing fuel cell power plant gaseous streams. In doing so, the fuel cell power plant of the present invention operates more efficiently than has heretofore been known in the art, while simultaneously reducing both the weight and volume of the fuel cell power plant as a whole.

Another important aspect of integrating the burner exhaust into the common chamber 110 lies in the ability of such a system to ensure that a sufficient amount of moisture will be available to humidify the inlet oxidant stream. This objective is accomplished, in direct fashion, by the burner exhaust itself adding a measured amount of moisture to the chamber 110, as well as in indirect fashion owing to the increased amount of moisture that the process exhaust stream leaving the chamber 110 is capable of absorbing.

It has been discovered that by blending the heated burner exhaust with the exhausted oxidant stream and the coolant, the process exhaust stream leaving the chamber 110 for the ERD 95 will be approximately 5° F. higher than would otherwise be the case. The resultant process exhaust stream leaving the chamber 110 for the ERD 95 will therefore be proportionally higher in moisture, given the linear relationship between higher temperatures of the process exhaust stream and the increasing capacity of the process exhaust stream to carry entrained moisture.

Figure 3:
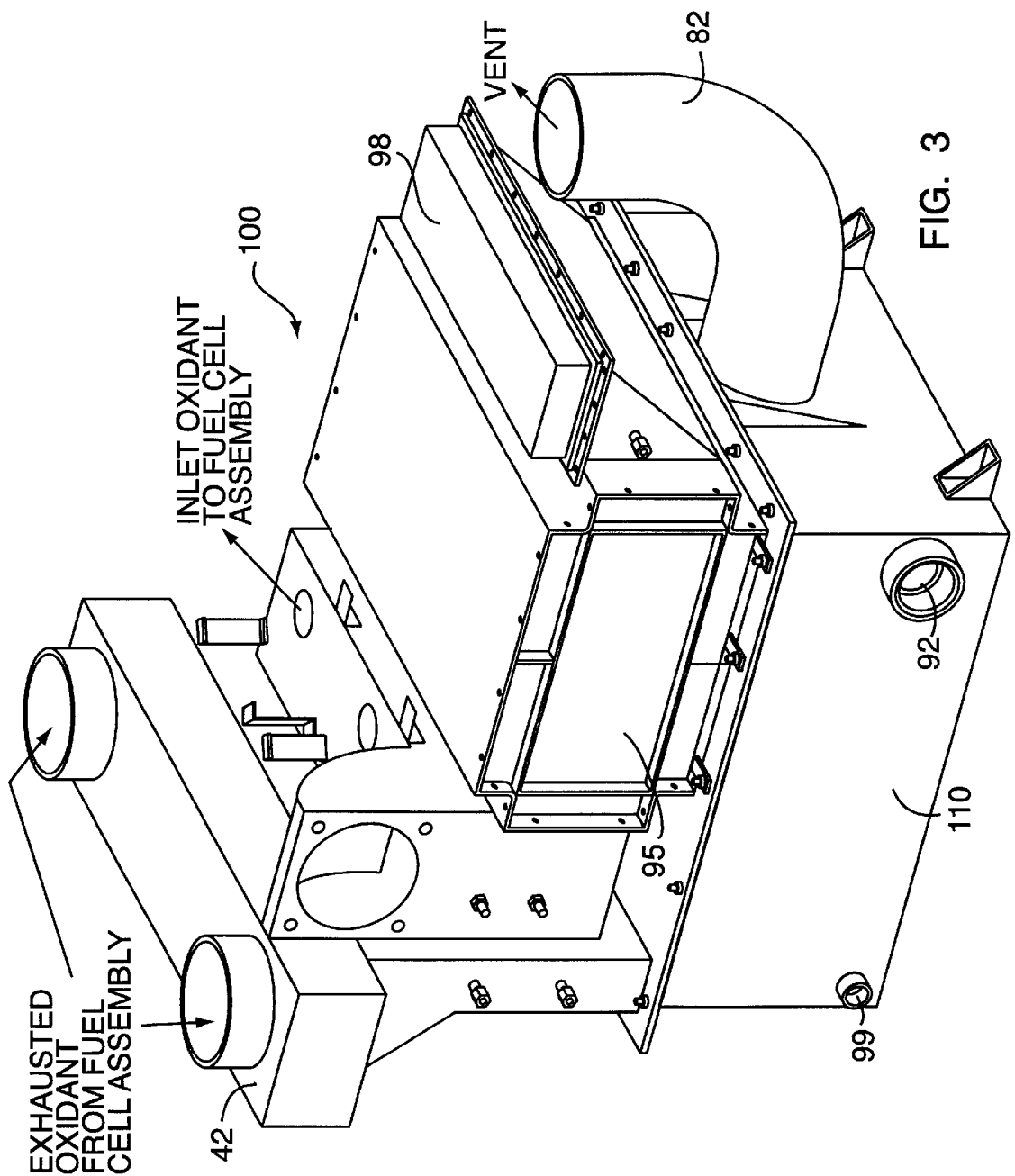
FIG. 3 is an isometric illustration of the housing as depicted in FIG. 2.

FIG. 3 illustrates a perspective view of the housing 100, according to one embodiment of the present invention. It will be readily appreciated that the inlet ERD manifold 98 may include a filter to ensure that contaminants, including air borne particulate, are prohibited from entering the fuel cell power plant 10.

Figure 4:
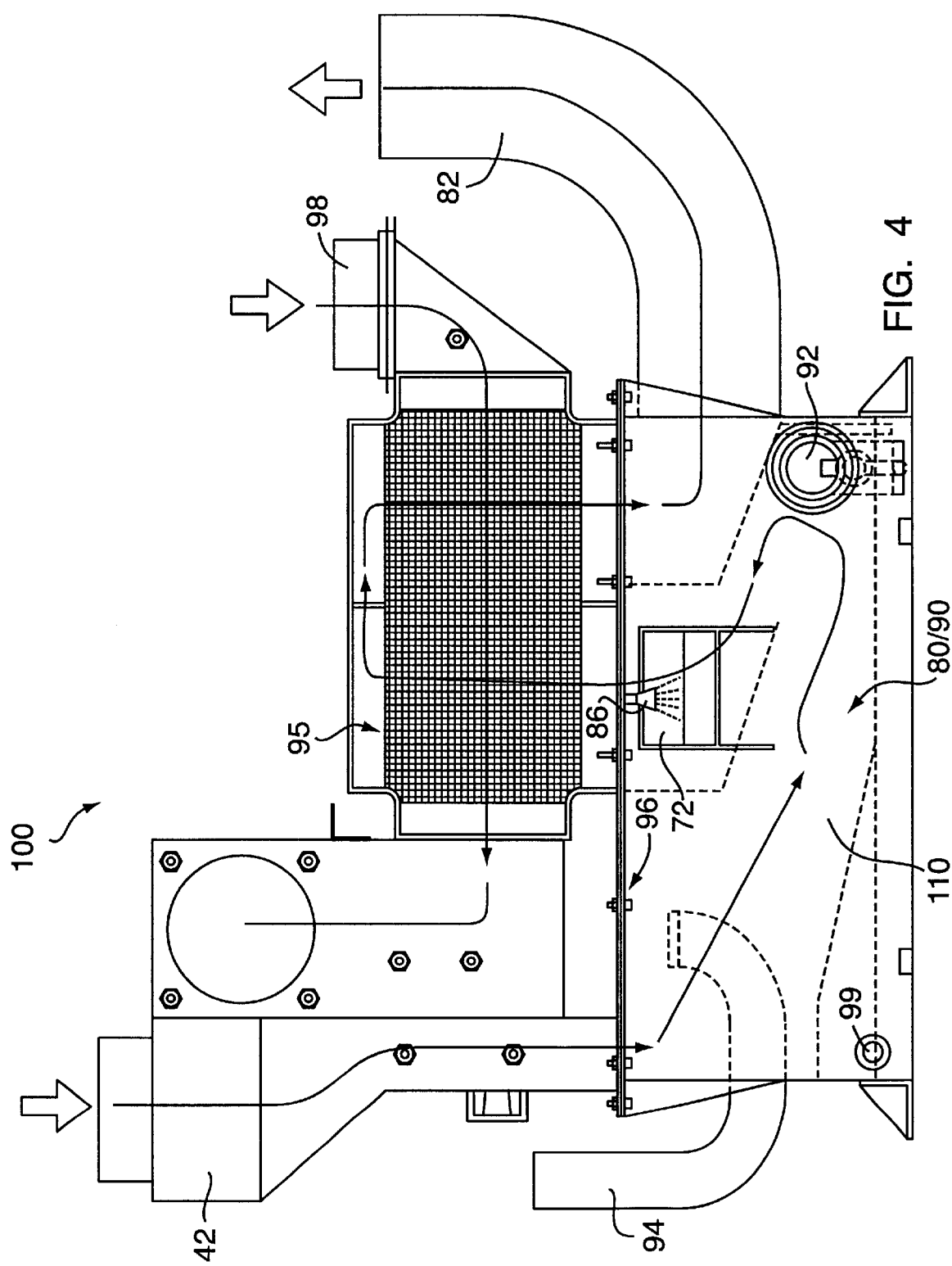
FIG. 4 is a cross-sectional view of a housing integrating multiple components of a fuel cell power plant according to another embodiment of the present invention.

FIG. 4 illustrates another embodiment of the present invention whereby the process exhaust stream incident upon the ERD 95 is further humidified so as to provide an even greater moisture content to the matrix of the ERD 95, as well as to the inlet oxidant stream. As depicted in FIG. 4, the spray nozzle assembly 86, or the like, is oriented adjacent the burner exhaust inlet opening 72 and is controlled to discharge a predetermined amount of moisture into the burner exhaust gases and the process exhaust stream within the chamber 110 prior to the process exhaust stream being directed through the ERD 95. One preferred method of operation includes maintaining a substantially uniform delivery rate of water to the spray nozzle 86, which is intentionally set higher than required for cooling and humidification, whereby any excess water will simply drain into the accumulator 90. With such an arrangement, the ability of the fuel cell power plant 10 to maintain an adequate moisture level in both the inlet oxidant stream and the ERD 95 is greatly enhanced. It will be readily appreciated that the spray nozzle assembly 86 may be controlled manually or automatically in dependence upon moisture sensors located in the ERD 95 or elsewhere in the housing 100. In addition, the spray nozzle assembly 86 may be alternatively controlled in dependence upon the output or load placed upon the fuel cell power plant 10, without departing from the broader aspects of the present invention. Regardless of placement, the spray nozzle 86 advantageously protects the ERD 95 from mechanical damage due to dryout or overheating.

As can be seen from the foregoing disclosure and figures in combination, a functionally integrated fuel cell power plant according to the present invention is advantageously provided with a plurality of beneficial operating attributes, including, but not limited to: humidifying the inlet oxidant stream, lessening the weight and volume of a fuel cell power plant as a whole and cleansing the coolant within the overall system to remove potentially harmful and debilitating contamination. All of these attributes contribute to the efficient operation of a fuel cell power plant and are especially beneficial to those applications, such as motor vehicle manufacturing, which demand high performance, reliability and low volume and weight.

While the invention had been described with reference to the preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all embodiments falling within the scope of the appended claims.

What is claimed is:

1. A fuel cell power plant having a plurality of functionally integrated components including a fuel cell assembly provided with a fuel stream, an oxidant stream and a coolant stream, said fuel cell power plant further comprising:

a mass and heat recovery device for promoting a transfer of thermal energy and moisture between a first gaseous stream and a second gaseous stream;

a burner for processing said fuel exhausted from said fuel cell assembly during operation thereof and exhausting a burner gaseous stream containing thermal energy and moisture;

a housing chamber in which said oxidant stream exhausted from said fuel cell assembly merges with said burner gaseous stream to form said first gaseous stream; and wherein said coolant stream that is exhausted from said fuel cell assembly is provided to said housing chamber, and wherein said oxidant stream exhausted from said fuel cell assembly merges with said burner gaseous stream in the presence of said exhausted coolant stream.

2. The fuel cell power plant having a plurality of functionally integrated components according to claim 1, wherein:

said oxidant stream is provided to said mass and heat recovery device prior to being provided to said fuel cell assembly; and said second gaseous stream is comprised of said oxidant stream.

3. The fuel cell power plant having a plurality of functionally integrated components according to claim 2, wherein:

said first gaseous stream is provided to said mass and heat recovery device in a counter-current manner to said second gaseous stream, wherein said second gaseous stream absorbs thermal energy and moisture from said first gaseous stream.

4. The fuel cell power plant having a plurality of functionally integrated components according to claim 1, wherein:

said housing chamber further comprising a degasifying portion and an accumulator portion.

5. The fuel cell power plant having a plurality of functionally integrated components according to claim 4, wherein:

said degasifying portion cleanses said exhausted coolant stream by promoting striping of contaminants from said exhausted coolant stream; and said accumulator collects said cleansed coolant stream.

6. The fuel cell power plant having a plurality of functionally integrated components according to claim 5, wherein:

said degasifiying portion comprising one of a packed bed, a wetted film and a spray tower.

7. The fuel cell power plant having a plurality of functionally integrated components according to claim 3, wherein:

said first gaseous stream is vented from said fuel cell power plant subsequent to interacting with said second gaseous stream.

8. The fuel cell power plant having a plurality of functionally integrated components according to claim 1, wherein:

said mass and heat recovery device is comprised of a hydrophillic matrix having pores formed therein, said pores adapted to be filed with a liquid transfer medium; and said liquid transfer medium comprising one of an aqueous salt solution, an aqueous acid solution, an organic antifreeze solution and water.

9. The fuel cell power plant having a plurality of functionally integrated components according to claim 1, further comprising:

a nozzle assembly oriented within said housing chamber and adjacent an inlet opening of said burner gaseous stream, said nozzle assembly injecting a predetermined quantity of moisture into said burner gaseous stream during operation.

10. The fuel cell power plant having a plurality of functionally integrated components according to claim 9, wherein:

said predetermined quantity of moisture injected by said nozzle assembly is automatically controlled in dependence upon one of a moisture sensor in said fuel cell power plant and a load of said fuel cell power plant.

11. The fuel cell power plant having a plurality of functionally integrated components according to claim 9, wherein:

said predetermined quantity of moisture injected by said nozzle assembly is supplied at a substantially uniform rate.

12. A fuel cell power plant having a plurality of functionally integrated components including a cell stack assembly having a plurality of fuel cell assemblies in electrical communication with one another, wherein said cell stack assembly is provided with a fuel stream, an oxidant stream and a coolant stream, said fuel cell power plant comprising:

an mass and heat recovery device for promoting a transfer of thermal energy and moisture between a first gaseous stream and a second gaseous stream;

a burner for processing said fuel exhausted from said cell stack assembly during operation thereof and exhausting a burner gaseous stream containing thermal energy and moisture;

a housing chamber in which said oxidant stream exhausted from said cell stack assembly merges with said burner gaseous stream to form said first gaseous stream; and wherein said coolant stream that is exhausted from said cell stack assembly is provided to said housing chamber, and wherein said oxidant stream exhausted from said cell stack assembly merges with said burner gaseous stream in the presence of said exhausted coolant stream.

13. The fuel cell power plant having a plurality of functionally integrated components according to claim 12, wherein:

said oxidant stream is provided to said mass and heat recovery device prior to being provided to said cell stack assembly; and said second gaseous stream is comprised of said oxidant stream.

14. The fuel cell power plant having a plurality of functionally integrated components according to claim 13, wherein:

said first gaseous stream is provided to said mass and heat recovery device in a counter-current manner to said second gaseous stream, wherein said second gaseous stream absorbs thermal energy and moisture from said first gaseous stream.

15. The fuel cell power plant having a plurality of functionally integrated components according to claim 12, wherein:

said housing chamber further comprising a degasifying portion and an accumulator portion.

16. The fuel cell power plant having a plurality of functionally integrated components according to claim 15, wherein:

said degasifying portion cleanses said exhausted coolant stream by promoting striping of contaminants from said exhausted coolant stream; and said accumulator collects said cleansed coolant stream.

17. The fuel cell power plant having a plurality of functionally integrated components according to claim 16, wherein:

said degasifiying portion comprising one of a packed bed, a wetted film and a spray tower.

18. The fuel cell power plant having a plurality of functionally integrated components according to claim 14, wherein:

said first gaseous stream is vented from said fuel cell power plant subsequent to interacting with said second gaseous stream.

19. The fuel cell power plant having a plurality of functionally integrated components according to claim 12, wherein:

said mass and heat recovery device is comprised of a hydrophillic matrix having pores formed therein, said pores adapted to be filed with a liquid transfer medium; and said liquid transfer medium comprising one of an aqueous salt solution, an aqueous acid solution, an organic antifreeze solution and water.

20. The fuel cell power plant having a plurality of functionally integrated components according to claim 12, further comprising:

a nozzle assembly oriented within said housing chamber and adjacent an inlet opening of said burner gaseous stream, said nozzle assembly injecting a predetermined quantity of moisture into said burner gaseous stream during operation.

21. The fuel cell power plant having a plurality of functionally integrated components according to claim 20, wherein:

said predetermined quantity of moisture injected by said nozzle assembly is automatically controlled in dependence upon one of a moisture sensor in said fuel cell power plant and a load of said fuel cell power plant.

22. The fuel cell power plant having a plurality of functionally integrated components according to claim 21, wherein:

said predetermined quantity of moisture injected by said nozzle assembly is supplied at a substantially uniform rate.

23. A fuel cell power plant having a plurality of functionally integrated components including a fuel cell assembly provided with a fuel stream, an oxidant stream and a coolant stream, said fuel cell power plant further comprising:

a mass and heat recovery device for promoting a transfer of thermal energy and moisture between a first gaseous stream and a second gaseous stream;

a burner for processing said fuel exhausted from said fuel cell assembly during operation thereof and exhausting a burner gaseous stream containing thermal energy and moisture;

a housing chamber in which said oxidant stream exhausted from said fuel cell assembly merges with said burner gaseous stream to form said first gaseous stream; and a nozzle assembly oriented within said housing chamber and adjacent an inlet opening of said burner gaseous stream, said nozzle assembly injecting a predetermined quantity of moisture into said burner gaseous stream during operation.

24. A fuel cell power plant having a plurality of functionally integrated components including a cell stack assembly having a plurality of fuel cell assemblies in electrical communication with one another, wherein said cell stack assembly is provided with a fuel stream, an oxidant stream and a coolant stream, said fuel cell power plant comprising:

an mass and heat recovery device for promoting a transfer of thermal energy and moisture between a first gaseous stream and a second gaseous stream;

a burner for processing said fuel exhausted from said cell stack assembly during operation thereof and exhausting a burner gaseous stream containing thermal energy and moisture;

a housing chamber in which said oxidant stream exhausted from said cell stack assembly merges with said burner gaseous stream to form said first gaseous stream; and a nozzle assembly oriented within said housing chamber and adjacent an inlet opening of said burner gaseous stream, said nozzle assembly injecting a predetermined quantity of moisture into said burner gaseous stream during operation.

* * * * *